(12) United States Patent
Correia (10) Patent No.: US 11,067,277 B2
(45) Date of Patent: Jul. 20, 2021

(54) COMPONENT ASSEMBLY FOR A GAS TURBINE ENGINE

(71) Applicant: General Electric Company, Schenectady, NY (US)

(72) Inventor: Victor Hugo Silva Correia, Milton Mills, NH (US)

(73) Assignee: General Electric Company, Schenectady, NY (US)

(*) Notice: Subject to any disclaimer, the term of this patent is extended or adjusted under 35 U.S.C. 154(b) by 818 days.

(21) Appl. No.: 15/287,853

(22) Filed: Oct. 7, 2016

(65) Prior Publication Data

US 2018/0100433 A1 Apr. 12, 2018

(51) Int. Cl.
| | |
|---|---|
| *F23R 3/16* | (2006.01) |
| *F01D 9/02* | (2006.01) |
| *F01D 9/04* | (2006.01) |
| *F02C 3/14* | (2006.01) |
| *F02C 7/28* | (2006.01) |
| *F23R 3/00* | (2006.01) |

(52) U.S. Cl.
CPC ............... *F23R 3/16* (2013.01); *F01D 9/023* (2013.01); *F01D 9/04* (2013.01); *F02C 3/14* (2013.01); *F02C 7/28* (2013.01); *F23R 3/002* (2013.01); *F23R 3/007* (2013.01); *F05D 2220/3212* (2013.01); *F05D 2260/941* (2013.01); *F23R 2900/00018* (2013.01); *Y02T 50/60* (2013.01)

(58) Field of Classification Search
CPC ... F01D 9/02; F01D 9/023; F01D 9/04; F01D 9/041; F01D 9/042; F23R 3/002; F23R 3/16; F23R 3/42
See application file for complete search history.

(56) References Cited

U.S. PATENT DOCUMENTS

| 2,558,816 A | * | 7/1951 | Bruynes | .................. B64C 23/06 |
| | | | | 138/37 |
| 2,607,191 A | * | 8/1952 | Lee | ........................... F23R 3/20 |
| | | | | 60/749 |

(Continued)

FOREIGN PATENT DOCUMENTS

| CN | 1757893 A | 4/2006 |
| CN | 105121960 A | 12/2015 |

(Continued)

OTHER PUBLICATIONS

English translation of DE 1020491 (Year: 1957).*
Chinese Office Action Corresponding to Application No. 2017109078202 dated Apr. 29, 2019.

*Primary Examiner* — Thomas P Burke
(74) *Attorney, Agent, or Firm* — McGarry Bair PC (57) ABSTRACT

A component assembly for a gas turbine engine having a combustor and defining a core air flowpath includes a first wall and a second wall. The first wall is configured for at least partially defining the core air flowpath at a location downstream of a combustion chamber defined by the combustor of the gas turbine engine. Additionally, the second wall is also configured for at least partially defining the core air flowpath at a location downstream of the combustion chamber, and is located opposite the core air flowpath of the first wall. The second wall includes a plurality of fins extending towards the first wall along the radial direction and spaced along the circumferential direction.

17 Claims, 8 Drawing Sheets

(56) References Cited

U.S. PATENT DOCUMENTS

| | | | | |
|---|---|---|---|---|
| 2,647,369 A * | 8/1953 | Leduc | ............ | F23R 3/04 |
| | | | | 60/804 |
| 2,704,440 A * | 3/1955 | Nicholson | ............ | F23R 3/16 |
| | | | | 60/737 |
| 2,780,060 A * | 2/1957 | Griffith | ............ | F02C 7/18 |
| | | | | 60/752 |
| 2,844,001 A * | 7/1958 | Alford | ............ | F02K 1/78 |
| | | | | 138/40 |
| 3,664,455 A * | 5/1972 | Duvvuri | ............ | F02K 1/46 |
| | | | | 181/215 |
| 3,921,391 A * | 11/1975 | Hall | ............ | F02K 7/10 |
| | | | | 60/749 |
| 3,999,378 A * | 12/1976 | Tatem, Jr. | ............ | F02K 3/11 |
| | | | | 60/737 |
| 4,195,396 A * | 4/1980 | Blazek | ............ | B23P 15/04 |
| | | | | 164/122.1 |
| 4,199,936 A * | 4/1980 | Cowan | ............ | F01N 1/02 |
| | | | | 60/226.1 |
| 4,298,089 A * | 11/1981 | Birch | ............ | F02K 1/386 |
| | | | | 181/213 |
| 4,401,269 A | 8/1983 | Eiler | | |
| 4,548,034 A | 10/1985 | Maguire | | |
| 4,786,016 A | 11/1988 | Presz, Jr. et al. | | |
| 5,207,064 A * | 5/1993 | Ciokajlo | ............ | F23R 3/16 |
| | | | | 60/737 |
| 5,518,311 A * | 5/1996 | Althaus | ............ | B01F 5/0451 |
| | | | | 138/37 |
| 5,687,572 A * | 11/1997 | Schrantz | ............ | F23R 3/007 |
| | | | | 431/352 |
| 5,953,919 A * | 9/1999 | Meylan | ............ | F01D 9/044 |
| | | | | 60/752 |
| 5,992,140 A | 11/1999 | Hammond et al. | | |
| 6,082,635 A | 7/2000 | Seiner et al. | | |
| 6,412,283 B1 | 7/2002 | Sheoran et al. | | |
| 6,804,948 B2 | 10/2004 | Oishi | | |
| 7,568,345 B2 | 8/2009 | Furletov et al. | | |
| 7,891,195 B2 | 2/2011 | Bouty et al. | | |
| 9,140,210 B2 | 9/2015 | Oba et al. | | |
| 10,036,552 B2 | 7/2018 | Rullaud et al. | | |
| 2006/0034689 A1* | 2/2006 | Taylor | ............ | F01D 5/143 |
| | | | | 415/211.2 |
| 2012/0003086 A1 | 1/2012 | Morris et al. | | |
| 2013/0232948 A1 | 9/2013 | Mengle | | |
| 2014/0212284 A1* | 7/2014 | Jamison | ............ | F01D 9/041 |
| | | | | 415/208.2 |
| 2014/0286768 A1* | 9/2014 | Boniface | ............ | F01D 5/145 |
| | | | | 415/208.1 |
| 2016/0146466 A1 | 5/2016 | Yang et al. | | |
| 2016/0146468 A1 | 5/2016 | Gao et al. | | |

FOREIGN PATENT DOCUMENTS

| | | | | |
|---|---|---|---|---|
| CN | 105627367 A | | 6/2016 | |
| DE | 1020491 B | * | 12/1957 | ............ F23R 3/02 |

* cited by examiner

COMPONENT ASSEMBLY FOR A GAS TURBINE ENGINE

FIELD OF THE INVENTION

The present subject matter relates generally to a gas turbine engine, or more particularly to a component assembly for a gas turbine engine, located immediately downstream of a combustion section of the gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

A forward end of the turbine section includes a first stage of turbine nozzles for directing and metering combustion gases from the combustion section through the turbine section. The first stage of turbine nozzles may be attached at a forward end to an outer liner or an inner liner of a combustor of the combustion section, and at an aft end to, e.g. a shroud surrounding a first stage of turbine rotor blades. However, given that the first stage of nozzles may be formed of a different material than the liners of the combustor of the combustion section, a mismatch of thermal expansion coefficients of such materials may make it difficult to form a desired, airtight seal therebetween.

Accordingly, a turbine section capable of forming an improved seal with a combustor of a combustion section would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a component assembly is provided for a gas turbine engine, the gas turbine engine including a combustor defining a combustion chamber, and defining a core air flowpath, a radial direction, and a circumferential direction. The component assembly includes a first wall for at least partially defining the core air flowpath at a location downstream of the combustion chamber. The component assembly additionally includes a second wall for at least partially defining the core air flowpath at a location downstream of the combustion chamber and located opposite the core air flowpath of the first wall. The second wall includes a plurality of fins extending towards the first wall along the radial direction and spaced along the circumferential direction.

In an exemplary aspect of the present disclosure, a gas turbine engine defining a radial direction and a circumferential direction is provided. The gas turbine engine includes a combustion section having a combustor defining a combustion chamber. The gas turbine engine also includes a turbine located downstream of the combustion section, the combustion section and the turbine at least partially defining a core air flowpath of the gas turbine engine. The turbine includes a component assembly and a first stage of turbine rotor blades located downstream of the component assembly. The component assembly includes an outer wall at least partially defining the core air flowpath, the outer wall including a plurality of outer fins extending inwardly along the radial direction, the plurality of outer fins spaced along the circumferential direction. The component assembly additionally includes an inner wall located inwardly from the outer wall along the radial direction and at least partially defining the core air flowpath. The inner wall includes a plurality of inner fins extending outwardly along the radial direction and spaced along the circumferential direction, each of the plurality of inner fins located between adjacent outer fins along the circumferential direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure generally relates generally to a component assembly for a gas turbine engine generally including a first, inner wall and a second, outer wall. The inner and outer walls each at least partially define a core air flowpath through the gas turbine engine, and the inner wall is located inward of the outer wall along a radial direction of the gas turbine engine. Moreover, the inner and outer walls are located immediately downstream of a combustion chamber defined by a combustor of the gas turbine engine. In certain embodiments, the outer wall may include a plurality of outer fins extending inwardly along the radial direction, and spaced generally along a circumferential direction of the gas turbine engine. Additionally, in certain embodiments, the inner wall may similarly include a plurality of inner fins extending outwardly along the radial direction and spaced generally along the circumferential direction, with each inner fin located between adjacent outer fins along the radial direction. The inner fins need not contact the outer wall, and the outer fins need not contact the inner wall. Such a configuration may replace a traditional first stage turbine nozzle of a gas turbine engine, and may provide for a lighter assembly, forming improved airtight seals, while performing substantially the same function.

Figure 1:
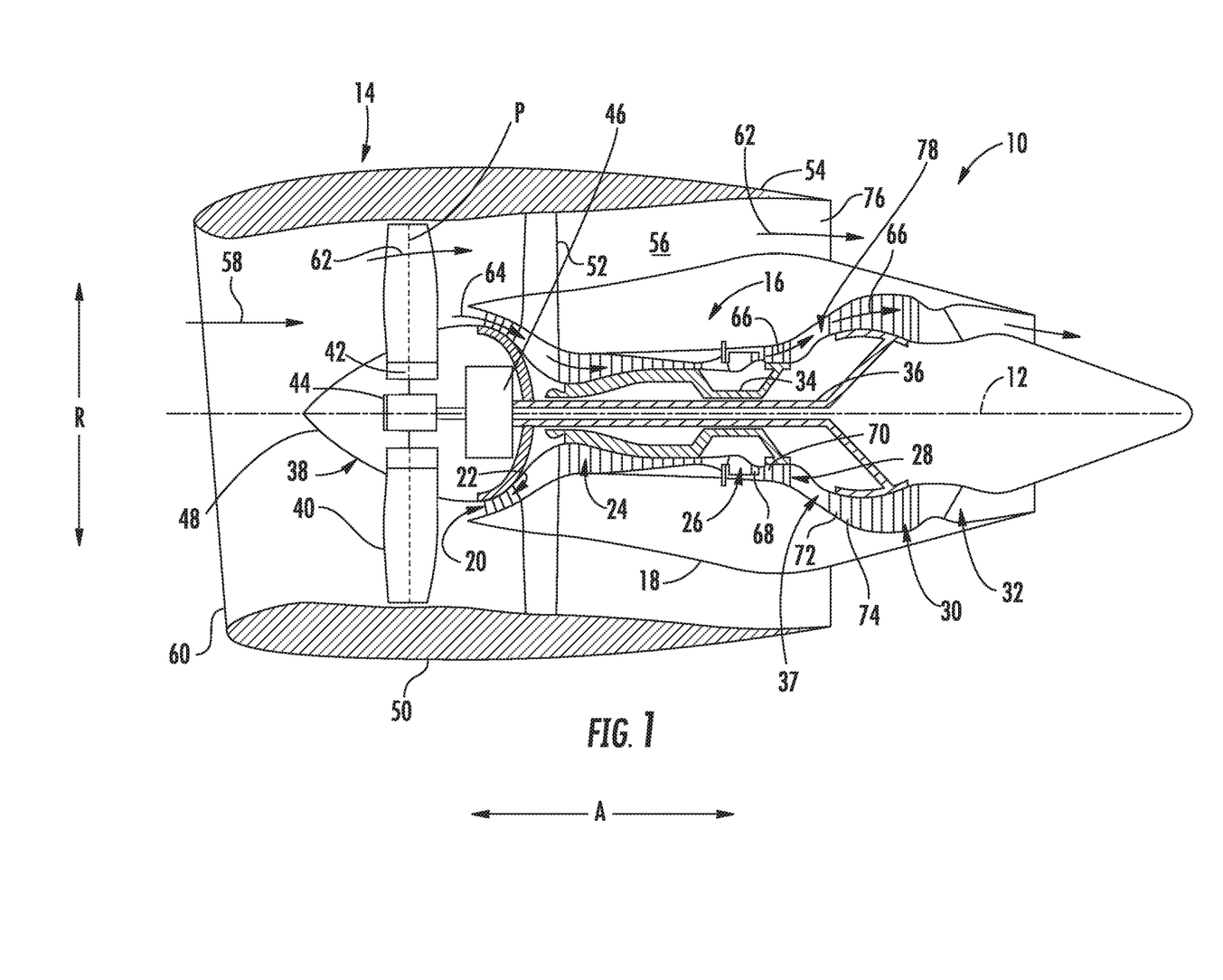
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and jet exhaust nozzle section 32 together define a core air flowpath 37 through the core turbine engine 16.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed from the combustion section 26, through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. Additionally, or alternatively, aspects of the present disclosure may be utilized with any other suitable aeronautical gas turbine engine, such as a turboshaft engine, turboprop engine, turbojet engine, etc. Moreover, aspects of the present disclosure may further be utilized with any other land-based gas turbine engine, such as a power generation gas turbine engine, or any aeroderivative gas turbine engine, such as a nautical gas turbine engine.

Figure 2:
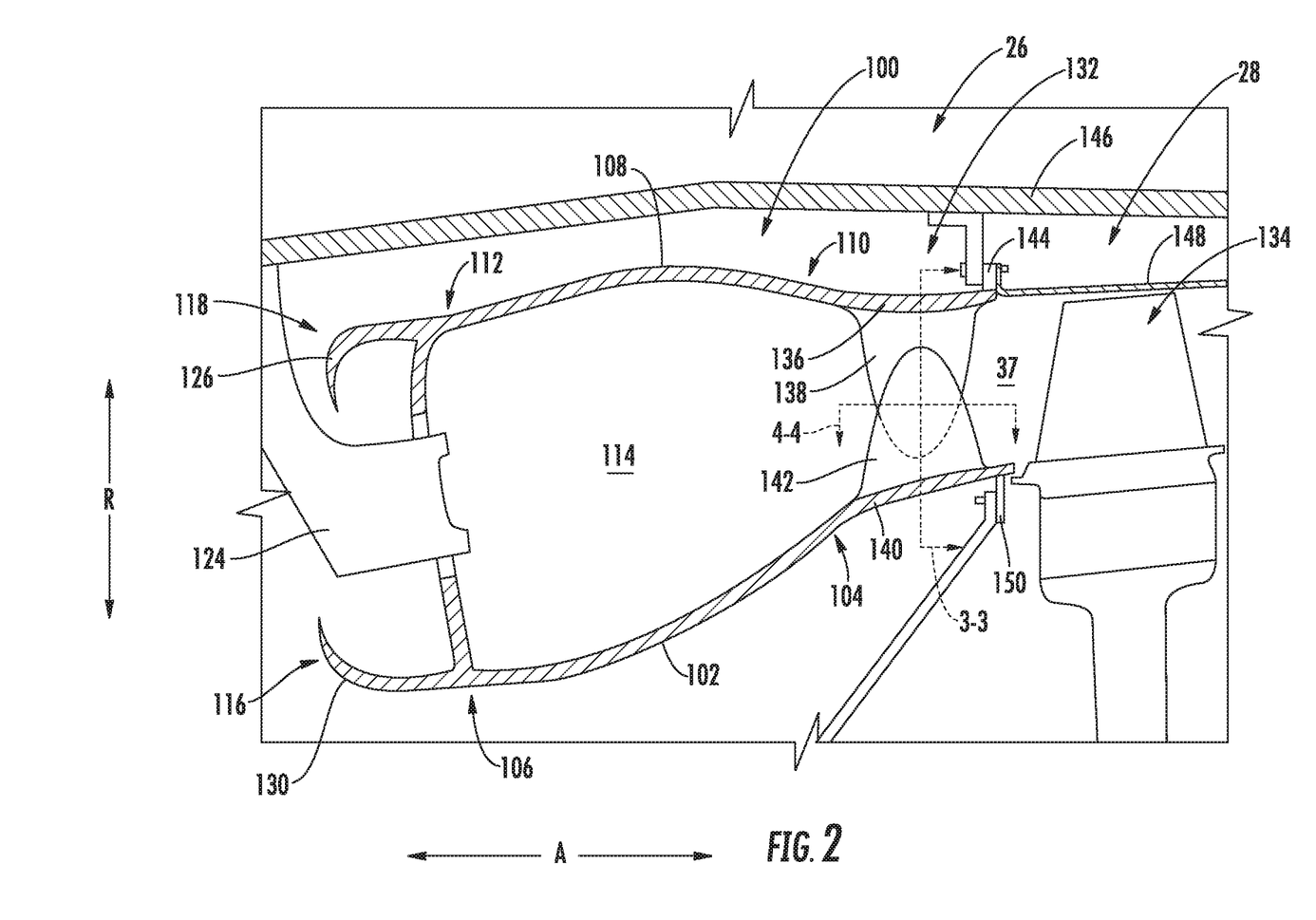
FIG. 2 is a schematic, cross-sectional view of a combustor assembly and a portion of a turbine section, including a component assembly, in accordance with an exemplary embodiment of the present disclosure.

Referring now to FIG. 2, a close-up, side, cross-sectional view is provided of a combustor assembly 100 and turbine in accordance with an exemplary embodiment of the present disclosure. In at least certain exemplary aspects, the combustor assembly 100 of FIG. 2 may be positioned in a combustion section 26 of the exemplary turbofan engine 10 of FIG. 1, and similarly, the turbine of FIG. 2 may be positioned in the turbine section of the exemplary turbofan engine 10 of FIG. 1.

As shown, the combustor assembly 100 generally includes an inner liner 102 extending between an aft end 104 and a forward end 106 generally along the axial direction A, as well as an outer liner 108 also extending between an aft end 110 and a forward end 112 generally along the axial direction A. The inner and outer liners 102, 108 together at least partially define a combustion chamber 114 therebetween. The inner and outer liners 102, 108 are each attached to or formed integrally with an annular dome. More particularly, the annular dome includes an inner dome section 116 formed integrally with the forward end 106 of the inner liner 102 and an outer dome section 118 formed generally with the forward end 112 of the outer liner 108. Further, the inner and outer dome section 116, 118 may each be formed integrally (or alternatively may be formed of a plurality of components attached in any suitable manner) and may each extend along the circumferential direction C to define an annular shape. It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

Referring still to FIG. 2, the combustor assembly 100 further includes a plurality of fuel air mixers 124 spaced along the circumferential direction C (not shown) and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section 26 into or through one or more of the fuel air mixers 124. Again, however, in other embodiments, the annular dome may be configured in any other suitable manner.

For the embodiment depicted, the inner liner 102 and the outer liner 108 are each formed of a ceramic matrix composite (CMC) material, which is a non-metallic material having high temperature capability. Exemplary CMC materials utilized for such liners 102, 108 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

Referring still to FIG. 2, and as is discussed above, the combustion gases 66 flow from the combustion chamber 114 into and through the turbine section of the turbofan engine 10, where a portion of thermal and/or kinetic energy from the combustion gases 66 is extracted via sequential stages of turbine stator vanes and turbine rotor blades. Notably, the turbine depicted in FIG. 2 is configured as an HP turbine 28, located immediately downstream of the combustion chamber 114 defined by the combustor assembly 100 of the combustion section 26.

As is depicted, the exemplary HP turbine 28 of FIG. 2 includes a component assembly 132 positioned at a forward end of the HP turbine 28, at a location downstream of, or rather immediately downstream of, the combustion chamber 114 of the combustor assembly 100. Additionally, the component assembly 132 is positioned immediately upstream of a first stage of turbine rotor blades 134. As will be described in greater detail below, the component assembly 132 is configured to orient the combustion gases 66 from the combustion chamber 114 in a desired flow direction to increase a performance of the HP turbine 28. The component assembly 132 of the HP turbine 28 depicted may generally replace a first stage of nozzles of the HP turbine 28.

Generally, the component assembly 132 includes a first, outer wall 136 at least partially defining the core air flowpath 37 at a location downstream of the combustion chamber 114. The exemplary outer wall 136 depicted includes a plurality of outer fins 138 extending inwardly along the radial direction R. The component assembly 132 additionally includes a second, inner wall 140 also at least partially defining the core air flowpath 37 at a location downstream of the combustion chamber 114, and located inwardly from the outer wall 136 along the radial direction R (i.e., opposite to the core air flowpath 37 from the outer wall 136). The exemplary inner wall 140 depicted similarly includes a plurality of inner fins 142 extending outwardly along the radial direction R. As will be appreciated from the Figures and description below, each of the plurality of inner fins 142 are located between adjacent outer fins 138 along the circumferential direction C and have a shape that is complementary to a shape of the adjacent outer fins 138. Moreover, the inner wall 140 is completely separate from the outer wall 136 in that the inner wall 140 is not directly connected to the outer wall 136. For example, the inner fins 142 do not contact the outer wall 136, and the outer fins 138 do not contact the inner wall 140.

As is depicted, for the embodiment of FIG. 2, the inner fins 142 are formed integrally with a base portion of the inner wall 140, and more specifically are formed by portions of the inner wall 140. Similarly, for the embodiment of FIG. 2, the outer fins 138 are formed integrally with a base portion of the outer wall 136, and more specifically are formed by portions of the outer wall 136. However, in other embodiments of the present disclosure, the inner fins 142 may be separately formed and attached to base portions of the inner wall 140, and/or the outer fins 138 may be separately formed and attached to base portions of the outer wall 136.

As is also depicted in FIG. 2, for the embodiment depicted, the outer wall 136 of the component assembly 132 is attached to or formed integrally with the outer liner 108 of the combustor assembly 100, and similarly the inner wall 140 of the component assembly 132 is attached to or formed integrally with the inner liner 102 of the combustor assembly 100. More specifically, for the embodiment depicted, the outer wall 136 is formed integrally with the outer liner 108 and the inner wall 140 is formed integrally with the inner liner 102. For example, in at least certain exemplary embodiments the outer wall 136 and inner wall 140, in addition to the outer liner 108 and the inner liner 102, may each be formed of a CMC material. It should be appreciated, however, that in other embodiments the outer wall 136 may be formed separately from the outer liner 108 and/or the inner wall 140 may be formed separately from the inner liner 102 (see, e.g., FIG. 5). Additionally, in still other embodiments, one or more of the outer liner 108, inner liner 102, outer wall 136, and inner wall 140 may be formed of any other suitable material, such as a suitable metal material.

Referring still to FIG. 2, the exemplary outer wall 136 of the component assembly 132 depicted additionally includes an outer flange 144 located aft of the outer fins 138 and extending outwardly along the radial direction R. The outer flange 144 of the outer wall 136 is utilized for attaching the outer wall 136 of the component assembly 132 to a casing 146 of the gas turbine engine, and further, for the embodiment depicted, for attaching the outer wall 136 to a shroud assembly 148 surrounding the first stage turbine rotor blades 134. Similarly, for the embodiment depicted, the inner wall 140 includes an inner flange 150 extending inwardly along the radial direction R at a location aft of the inner fins 142. The inner flange 150 of the inner wall 140 is utilized for attaching the inner wall 140 of the component assembly 132 to an inner structural component of the gas turbine engine (not shown). The outer flange 144 of the outer wall 136 and/or the inner flange 150 of the inner wall 140 may extend continuously along the circumferential direction C, or alternatively, may be configured as a plurality of discrete flanges spaced along the circumferential direction C. However, in other embodiments, one or both of the outer wall 136 or inner wall 140 of the component assembly 132 may instead be mounted in any other suitable manner within the gas turbine engine.

Figure 3:
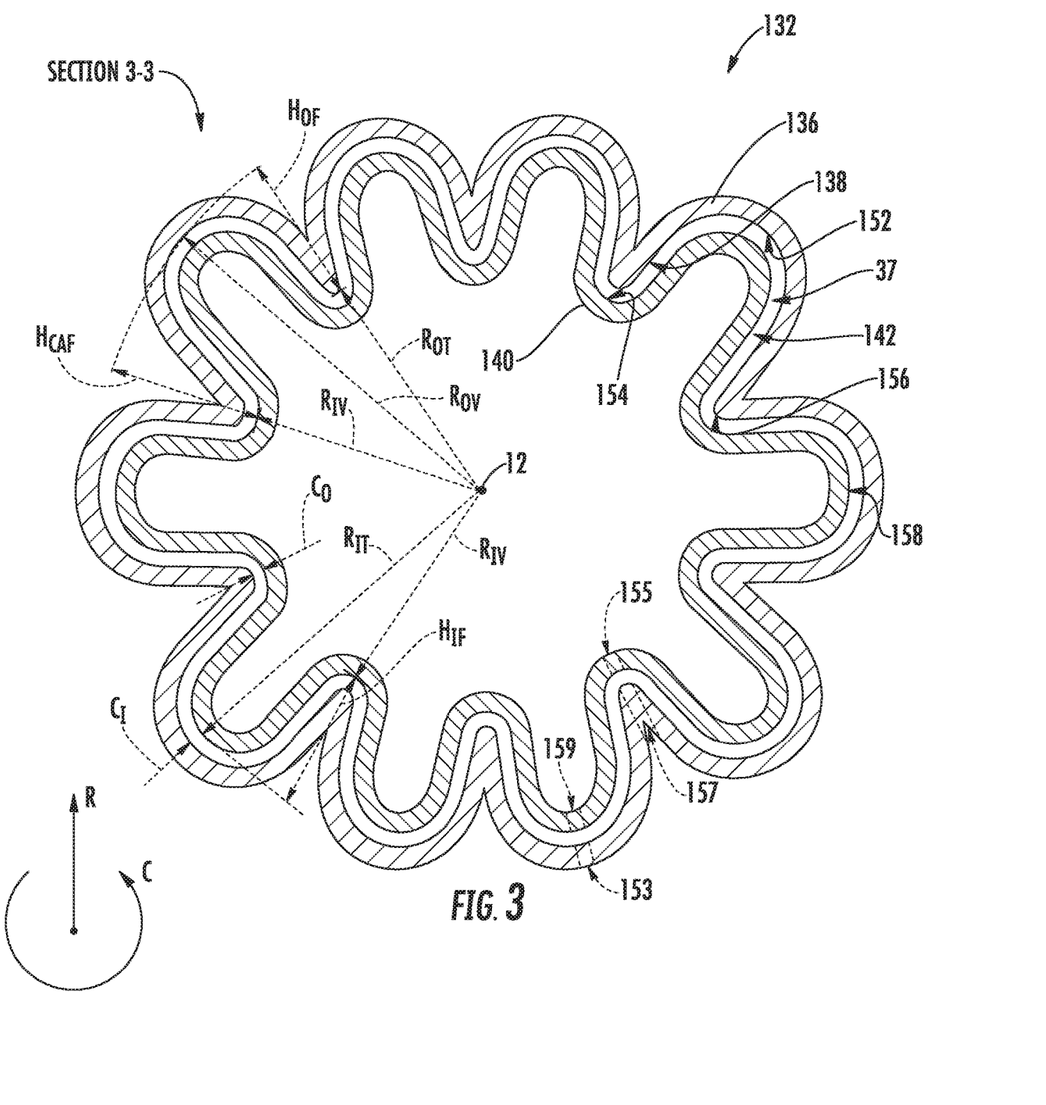
FIG. 3 is an axial, cross-sectional view of the exemplary component assembly of FIG. 2, taken along Line 3-3 of FIG. 2.

Referring now to FIG. 3, an axial, cross-sectional view is provided of the exemplary component assembly 132 of FIG. 2, taken along Line 3-3 of FIG. 2. As previously stated, the inner wall 140 of the component assembly 132 is located inwardly of the outer wall 136 along the radial direction R, and the inner wall 140 and outer wall 136 together define a portion of the core air flowpath 37 extending therebetween.

Each of the plurality of outer fins 138 of the outer wall 136 are spaced along the circumferential direction C, and similarly, each of the plurality of inner fins 142 are spaced along the circumferential direction C. Additionally, the inner fins 142 are located between adjacent outer fins 138 along the circumferential direction C. More specifically, for the embodiment depicted, each of the outer fins 138 are spaced substantially evenly along the circumferential direction C, and further, each of the inner fins 142 are also spaced substantially evenly along the circumferential direction C.

Further, the outer wall 136 includes a plurality of outer valleys 152 between adjacent outer fins 138 and the inner wall 140 similarly includes a plurality of inner valleys 154 between adjacent inner fins 142. Additionally, each outer fin 138 includes an outer fin tip 156 and each inner fin 142 includes an inner fin tip 158. Notably, as used herein, the outer valleys 152 refer to the most radially outward locations between adjacent outer fins 138 at a given location along the axial centerline 12, while the inner valleys 154 refer to the most radially inward locations between adjacent inner fins 142 at a given location along the axial centerline 12. Further, the outer fin tip 156 of an outer fin 138 refers to the most radially inward location of a given outer fin 138, while the inner fin tip 158 of an inner fin 142 refers to the most radially outward location of a given inner fin 142.

As is depicted, the outer fins 138 extend towards the inner valleys 154 along the radial direction R, such that the outer fin tips 156 of the outer fins 138 are positioned adjacent to the inner valleys 154. Additionally, the inner fins 142 extend towards the outer valleys 152 along the radial direction R, such that the inner fin tips 158 of the inner fins 142 are positioned adjacent to the outer valleys 152.

Moreover, for the embodiment depicted, each of the outer fins 138 are substantially the same size as one another and each of the inner fins 142 are also substantially the same size as one another. For example, the outer valleys 152 each define a radius $R_{OV}$ along the radial direction R relative to the axial centerline 12, with the radius $R_{OV}$ being about equal for each outer valley 152; the outer fin tips 156 of each of the respective outer fins 138 define a radius $R_{OT}$ along the radial direction R relative to the axial centerline 12, with the radius $R_{OT}$ being about equal for each outer fin tip 156; the inner valleys 154 each define a radius $R_{IV}$ along the radial direction R relative to the axial centerline 12, with the radius $R_{IV}$ being about equal for each inner valley 154; and the inner fin tips 158 of each of the respective inner fins 142 defines a radius $R_{IT}$ along the radial direction R relative to the axial centerline 12, with the radius $R_{IT}$ being about equal for each inner fin tip 158. It should be appreciated, that as used herein, terms of approximation, such as "about" or "approximately", refer to being within a ten percent (10%) margin.

Furthermore, it should be appreciated that a portion of the core air flowpath 37 defined by the component assembly 132 defines a height $H_{CAF}$ along the radial direction R at a given location along the axial centerline 12. The height $H_{CAF}$ of the core air flowpath 37 defined by the component assembly 132 at a given location may refer to a difference between the radius $R_{OV}$ of the outer valley 152 and the radius $R_{IV}$ of the inner valley 154.

Additionally, it should be appreciated, that the plurality of inner fins 142 of the inner wall 140 and the plurality of outer fins 138 of the outer wall 136 each also define a height, height $H_{IF}$ and height $H_{OF}$, respectively. The height $H_{IF}$ of the inner fins 142 may refer to a difference between the radius $R_{IT}$ of an inner fin tip 158 of an inner fin 142 of the inner wall 140 and the radius $R_{IV}$ of an adjacent inner valley 154 of the inner wall 140. Similarly, the height $H_{OF}$ of the outer fins 138 may refer to a difference between the radius $R_{OT}$ of an outer fin tip 156 of an outer fin 138 of the outer wall 136 and the radius $R_{OV}$ of an adjacent outer valley 152 of the outer wall 136. It should be appreciated, that for the embodiment depicted, the height $H_{IF}$ of the inner fins 142 of the inner wall 140 and the height $H_{OF}$ of the outer fins 138 of the outer wall 136 are each greater than or equal to about fifty percent (50%) of the height $H_{CAF}$ of the core air flowpath 37 at the given location along the axial centerline 12. For example, in certain embodiments, the height $H_{IF}$ of the inner fins 142 of the inner wall 140 and the height $H_{OF}$ of the outer fins 138 of the outer wall 136 may be greater than or equal to about sixty percent (60%) of the height $H_{CAF}$ of the core air flowpath 37 at a given location along the axial centerline 12, such as greater than or equal to about seventy-five percent (75%) of the height $H_{CAF}$ of the core air flowpath 37 at the given location along the axial centerline 12. It will be appreciated, however, that the heights $H_{OF}$, $H_{IF}$ of the fins 138, 142 can vary along the axial direction A, and each may reach a maximum height $H_{OF}$, $H_{IF}$ at a throat defined by the component assembly.

Moreover, it should be appreciated, that in certain exemplary embodiments, one or more of the inner wall 140 and outer wall 136 may include openings or holes to allow an airflow therethrough (i.e., into the core air flowpath 37). For example, as is depicted in phantom in FIG. 3, the inner wall 140 may define an airflow passage 155 at one or more of the inner valleys 154 and an airflow passage 159 at one or more of the inner fin tips 158, and similarly, the outer wall 136 may define an airflow passage 153 at one or more of the outer valleys 152 and an airflow passage 157 at one or more of the outer fin tips 156. Although the embodiment depicted includes a single one of each of the airflow passages 153, 155, 157, 159, it should be appreciated that in other exemplary embodiments, each of the outer valleys 152, each of the outer fin tips 156, each of the inner valleys 154, and each of the inner fin tips 158 may include one or more airflow passages 153, 155, 157, 159, respectively. Inclusion of the airflow passages 153, 155, 157, 159 may act as a fluidic dam to discourage flowpath air from passing over the inner and outer fin tips 158, 156.

Figure 4:
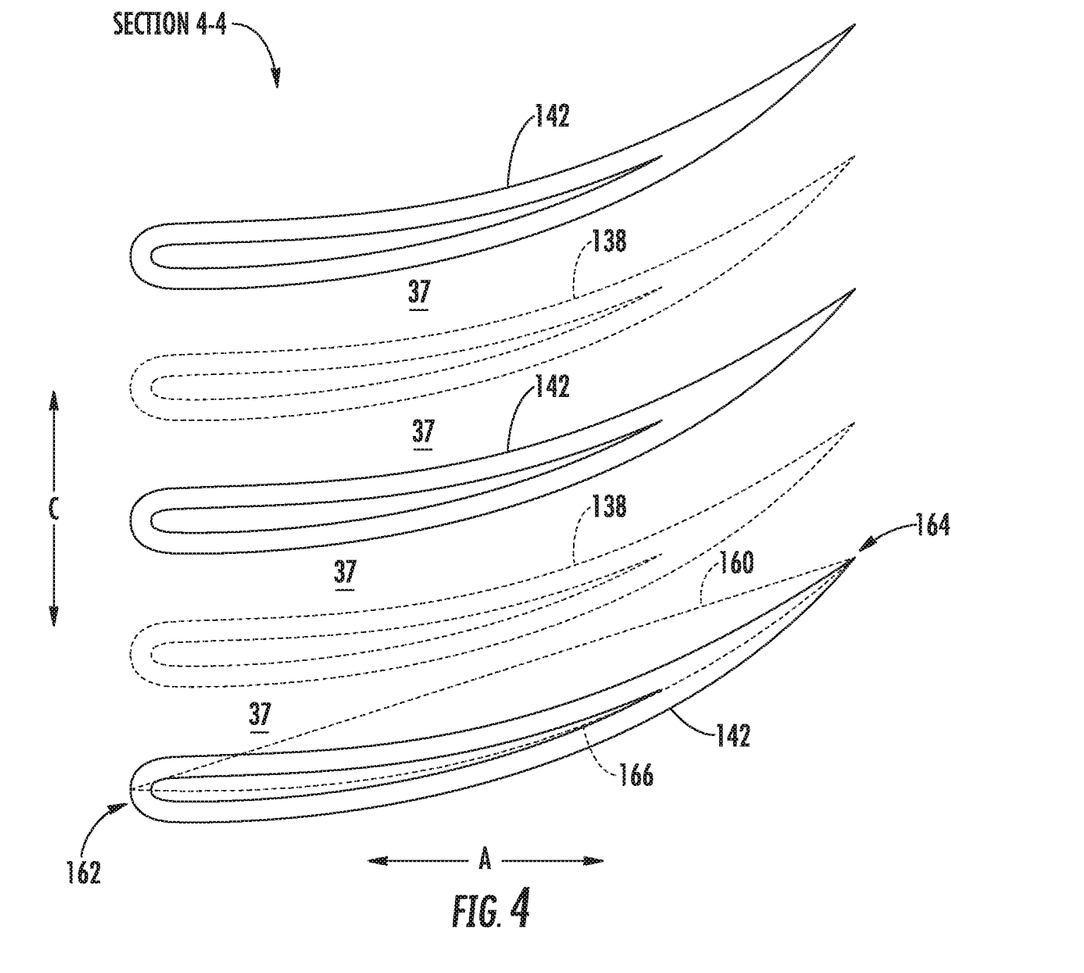
FIG. 4 is a radial, cross-sectional view of the exemplary component assembly of FIG. 2, taken along Line 4-4 of FIG. 2.

Referring now to FIG. 4, a radial view of the plurality of fins of the inner and outer wall 140, 136 of the component assembly 132 is provided, taken along Line 4-4 in FIG. 2. As is depicted, each of the plurality of outer fins 138 define a curved profile along the axial direction A, and further, each of the plurality of inner fins 142 also define a curved profile along the axial direction A. More particularly, each of the plurality of inner fins 142 and outer fins 138 defines an airfoil shape along the axial direction A, for directing a flow of combustion air flowing therethrough in a desired direction. For example, each of the plurality of inner fins 142 and outer fins 138, for the radial cross-sections depicted, may define a chord line 160 extending from a leading edge 162 to a trailing edge 164, and a mean camber line 166, also extending from the leading edge 162 to the trailing edge 164. For the embodiment depicted, the mean camber line 166 is divergent from the chord line 160, such that each of the inner fins 142 and outer fins 138 defines a camber. Furthermore, for the embodiment depicted, each of the inner fins 142 and outer fins 138 defines a sufficient enough camber/curve along the axial direction A, such that the chord lines 160 extend outside of the respective inner fins 142 and outer fins 138.

Notably, the radial cross-sectional view of FIG. 4 is taken approximately halfway through a height $H_{CAF}$ of the core air flowpath 37. For the embodiment depicted, the inner fins 142 and outer fins 138 are sized such that each defines a substantially equal cross-sectional radial area at this location along the radial direction R.

As will be appreciated from FIGS. 2 through 4, and the description herein, inclusion of a component assembly in accordance with one or more the exemplary aspects of the present disclosure may provide for a lighter and more efficient gas turbine engine. More specifically, by including an outer wall of a component assembly attached to or formed integrally with an outer liner of a combustor assembly, along with an inner wall of the component assembly attached to or formed integrally with an inner liner of the combustor assembly, the gas turbine engine may reduce an amount of combustion gasses seeping through a connection therebetween. Similarly, by inclusion of a continuous inner wall and outer wall, the gas turbine engine may reduce an amount of combustion gasses seeping through axial gaps between conventional nozzle segments. Additionally, such a configuration may eliminate a need for additional sealing components and hardware, which may reduce a cost and weight of the gas turbine engine. Further, by including inner and outer fins in accordance with the present disclosure, less surface area may need to be cooled, and/or the components may be formed of material capable of handling increased temperatures, such that less cooling air may be required during operation of the gas turbine engine.

Moreover, inclusion of a component assembly in accordance with one or more the exemplary aspects of the present disclosure may provide for a more durable engine. Specifically, as the inner wall and outer wall do not contact one another, and are not directly connected to one another, there is a reduced risk of cracking and other distress on the components.

It should be appreciated, however, that the exemplary component assembly 132 depicted in FIGS. 2 through 4, and described above, is provided by way of example only, and that in other exemplary embodiments, the component assembly 132 may have any other suitable configuration. For example, in other embodiments, one or more of the plurality of inner fins 142 or outer fins 138 may define a distinct shape or size from the remaining inner fins 142 and outer fins 138, or one of the inner wall or outer wall may not include fins altogether. Additionally, or alternatively, one or both of the plurality of inner fins 142 and outer fins 138 may not be spaced substantially equally along the circumferential direction C, and instead may be unevenly spaced based on, e.g., circumferential positions of the fuel nozzles of the combustion section 26. Similarly, in other embodiments, one or both of the plurality of inner fins 142 and outer fins 138 may define a distinct curve along the axial direction A for any suitable reason or purpose. Further, still, in other embodiments, one or both of the plurality of inner fins 142 and outer fins 138 may define a different shape along the axial direction A, such as a more or less aggressive angle at a forward end or at an aft end along the axial direction A.

Further, still, in other embodiments, the component assembly 132 may be attached to the combustor assembly 100 and/or shroud in any other suitable manner. For example, referring now to FIG. 5, a close-up cross-sectional view is provided of a combustor assembly 100 and turbine in accordance with another exemplary embodiment of the present disclosure. The exemplary combustor assembly 100 and turbine of FIG. 5 may be configured in substantially the same manner as exemplary combustor assembly 100 and turbine described above with reference FIG. 2. Accordingly, the same or similar numbers may refer to the same or similar part.

Figure 5:
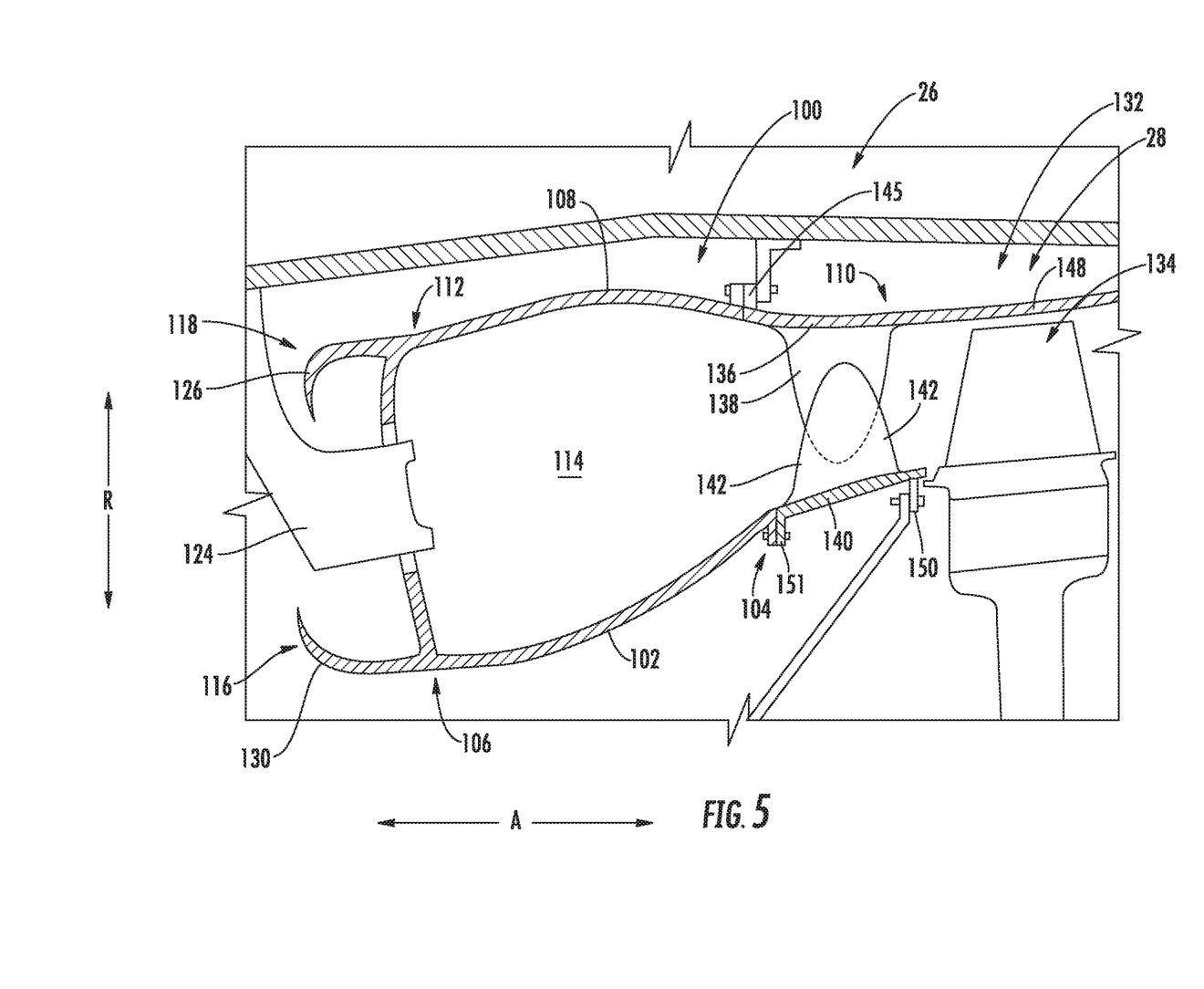
FIG. 5 is a schematic, cross-sectional view of a combustor assembly and a portion of the turbine section, including a component assembly, in accordance with another exemplary embodiment of the present disclosure.

For example, the exemplary combustor assembly 100 generally includes an inner liner 102 and an outer liner 108, the inner and outer liners 102, 108 together defining a combustion chamber 114. The combustor assembly 100 further includes an annular dome positioned at a forward end of the inner and outer liners 102, 108, formed integrally with the inner and outer liners 102, 108. The annular dome includes a plurality of openings through which a plurality of fuel air mixers 124 are provided for generating combustion gases 66 during operation.

Additionally, the turbine, which for the embodiment depicted is also configured as an HP turbine 28, includes a component assembly 132 positioned immediately downstream of the combustion chamber 114 defined by the inner and outer liners 102, 108 of the combustor assembly 100. The component assembly 132 generally includes an inner wall 140 having a plurality of inner fins 142 and an outer wall 136 including a plurality of outer fins 138. However, for the embodiment depicted the outer wall 136 is not formed integrally with the outer liner 108, and instead is simply attached to the outer liner 108. Further, the inner wall 140 is not formed integrally with the inner liner 102, and instead is simply attached to the inner liner 102. More specifically, the outer liner 108 includes an outer flange 144 configured for attachment to a flange 145 of the outer liner 108, and the inner liner 102 similarly includes an inner flange 150 configured for attachment to a flange 151 of the inner liner 102. Notably, for the embodiment depicted, the outer liner 108 may be formed of the same material as the outer wall 136, and similarly, the inner liner 102 may be formed of the same material as the inner wall 140. Such a configuration may allow for the outer liner 108 to be attached directly to the outer wall 136 and the inner liner 102 to be attached directly to the inner wall 140, without concern for undesirable thermal stress during operation of the gas turbine engine. Such a direct attachment may prevent any undesirable leakage of combustion gasses during operation.

Further, for the embodiment of FIG. 5, the HP turbine 28 also includes a shroud assembly 148 positioned radially outward of a first stage of turbine rotor blades 134, surrounding the first age of turbine rotor blades. The shroud assembly 148 may be positioned in a substantially tight clearance with radially outer tips of the plurality of first stage rotor blades 134 for forming a seal with the plurality of first stage rotor blades 134. For the embodiment depicted, at least a portion of the shroud assembly 148 is formed integrally with the outer wall 136 of the component assembly 132. Such a configuration may reduce a risk of leakage of combustion gasses 66 during operation of the gas turbine engine.

Figure 6:
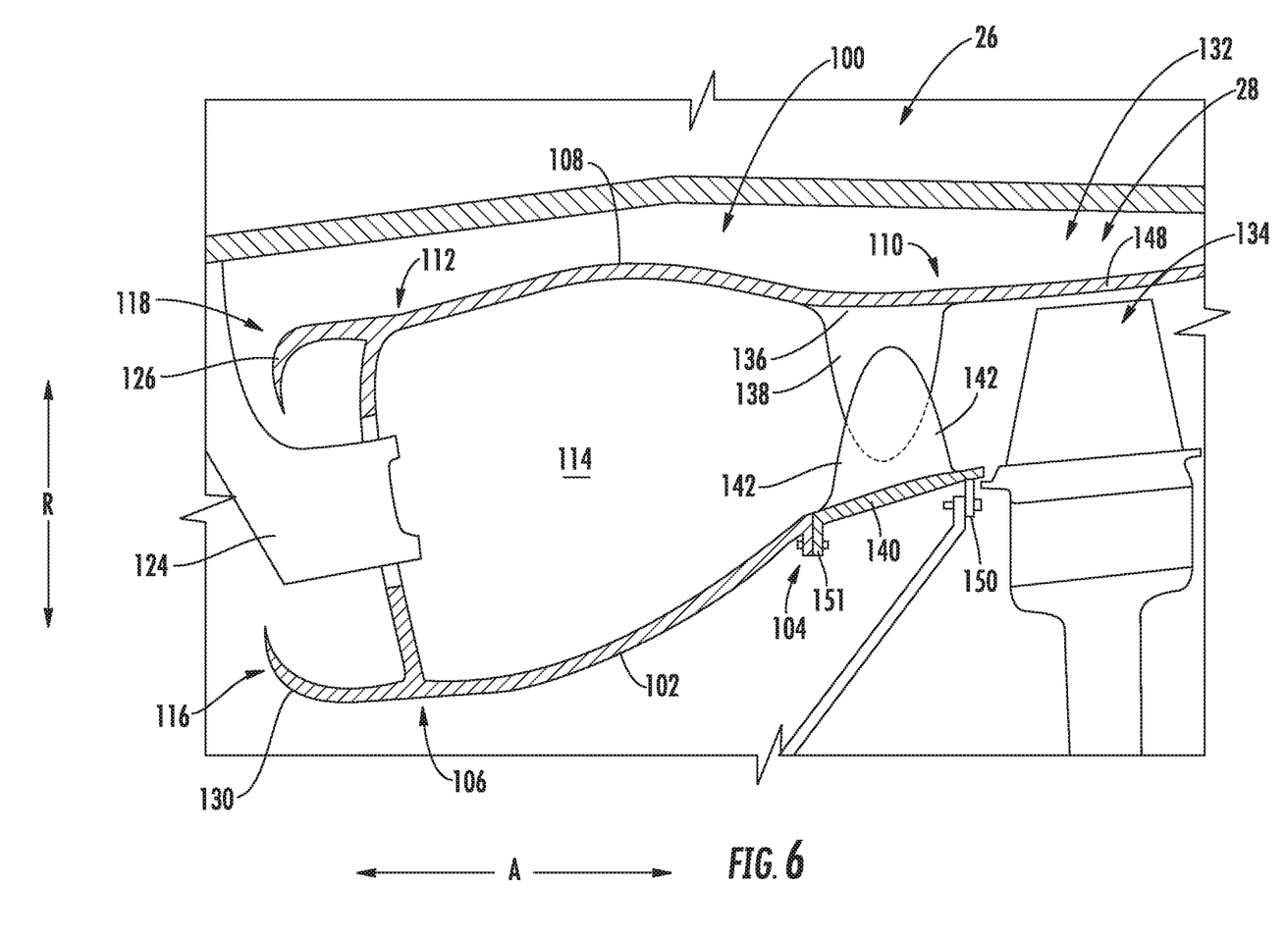
FIG. 6 is a schematic, cross-sectional view of a combustor assembly and a portion of the turbine section, including a component assembly, in accordance with yet another exemplary embodiment of the present disclosure.

It should be appreciated, however, that in yet another exemplary embodiment of the present disclosure, the outer wall 136 may further be formed integrally with both the outer liner 108 and the shroud assembly 148. For example, referring briefly to FIG. 6, providing another close-up, cross-sectional view of a combustor assembly 100 and turbine configured in substantially the same manner as FIG. 2, the outer liner 108 of the combustor assembly 100 is formed integrally with and extends continuously to the outer wall 136 of the component assembly 132, and the outer wall 136 of the component assembly 132 is, in turn, formed integrally with and extends continuously to the shroud assembly 148. Notably, for these components that are formed integrally, there are no seams or gaps present where the components meet.

Furthermore, as noted above, in still other exemplary embodiments of the present disclosure, one or more of the inner fins 142, inner valleys 154, outer fins 138, and outer valleys 152 may define any other suitable shape. For example, referring now to FIG. 7, an axial, cross-sectional view is provided of a component assembly 132 in accordance with another exemplary embodiment of the present disclosure, viewed from the same perspective as Line 3-3 of FIG. 2. The component assembly 132 of FIG. 7 may also be configured in a manner similar to the exemplary component assembly 132 of FIGS. 2 through 4, and accordingly the same or similar numbers may refer to same or similar part.

Figure 7:
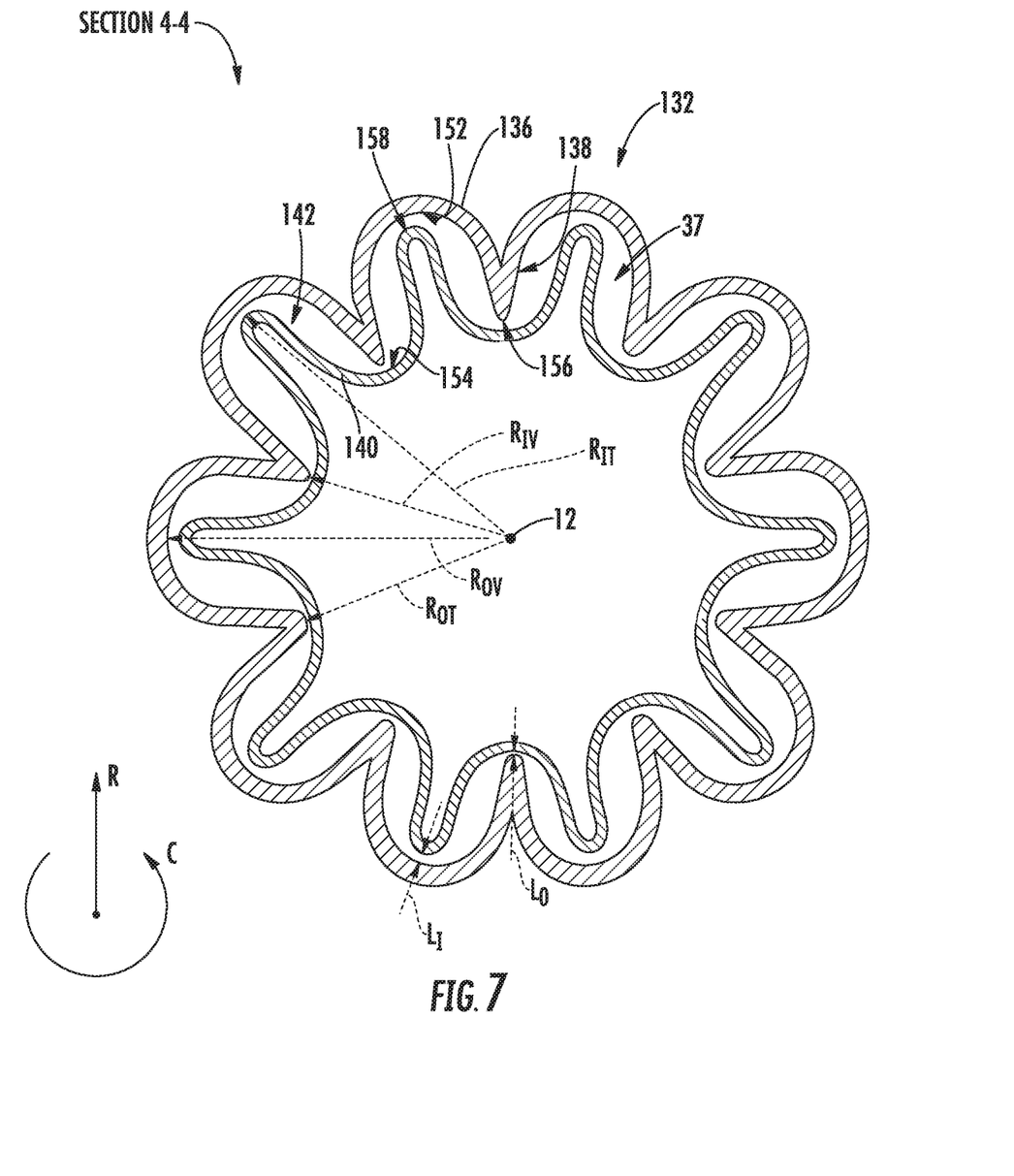
FIG. 7 is an axial, cross-sectional view of a component assembly in accordance with another exemplary embodiment of the present disclosure.

As is depicted, the exemplary component assembly 132 of FIG. 7 similarly includes an outer wall 136 having a plurality of outer fins 138, the outer wall 136 also including a plurality of outer valleys 152 between adjacent outer fins 138, and each outer fin 138 defining an outer fin tip 156. Additionally, the component assembly 132 of FIG. 7 includes an inner wall 140 having a plurality of inner fins 142, the inner wall 140 also including a plurality of inner valleys 154 between adjacent inner fins 142 and each inner fin 142 defining an inner fin tip 158. The outer fin tip 156 of each outer fin 138 extends towards a respective inner valley 154 along the radial direction R, and an inner fin tip 158 of each inner fin 142 extends towards a respective outer valley 152 along the radial direction R.

However, for the embodiment of FIG. 7, the inner wall 140 and outer wall 136 are configured such that the inner fin tips 158 define a relatively small clearance $C_I$ with the respective outer valleys 152 along the radial direction R, and similarly such that the outer fin tips 156 define a relatively small clearance $C_O$ with the respective inner valleys 154 along the radial direction R. More particularly, as is depicted, for the embodiment of FIG. 7, the clearances $C_O$, $C_I$ may be relatively small compared to, e.g., a spacing between adjacent inner fins 142 and outer fins 138, as well as compared to a height $H_{CAF}$ of a core air flowpath 37 defined between the inner wall 140 and the outer wall 136.

For example, in at least certain exemplary embodiments, the clearances $C_O$, $C_I$ may each be less than about fifteen percent (15%) of the height $H_{CAF}$ of the core air flowpath 37, such as less than about ten percent (10%) of the height $H_{CAF}$ of the core air flowpath 37, such as less than about five percent (5%) of the height $H_{CAF}$ of the core air flowpath 37. Such a configuration may further improve an efficiency of the component assembly 132 in directing a flow of combustion gasses therethrough.

Figure 8:
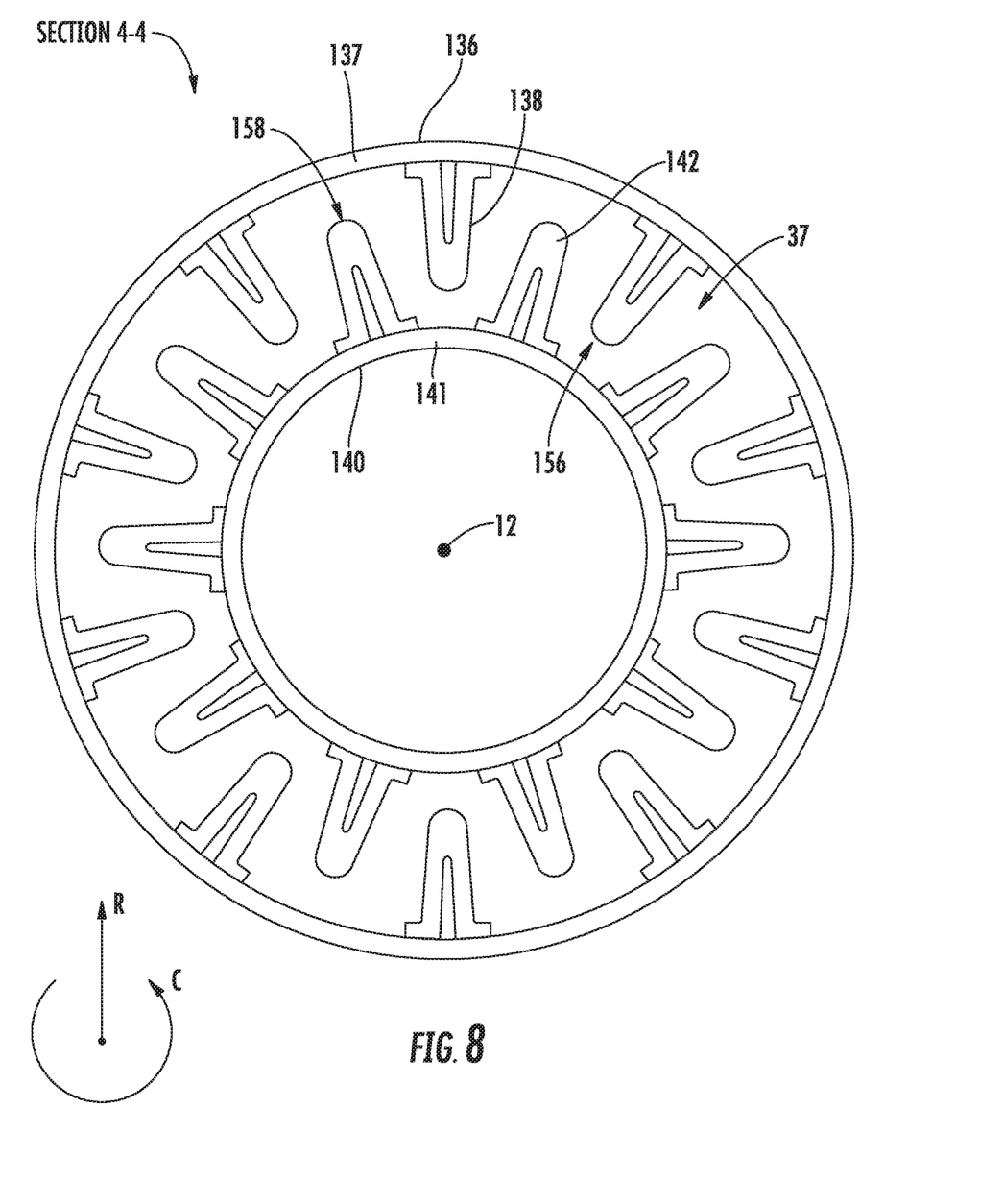
FIG. 8 an axial, cross-sectional view of a component assembly in accordance with yet another exemplary embodiment of the present disclosure.

Moreover, as was also noted above, in other exemplary embodiments, one or more of the inner fins 142 or outer fins 138 may be formed separately from a base portion 141 of the respective inner wall 140 and/or a base portion 137 of the outer wall 136. For example, referring briefly to FIG. 8, the inner wall 140 includes a base portion 141 (forming an inner ring) and a plurality of separately formed fins 142. The separately formed fins 142 are configured as partial nozzles (i.e., nozzles extending towards, but stopping short of the outer wall 136) and are attached to the base portion 141. Similarly, the outer wall 136 includes a base portion 137 (forming an outer ring) and a plurality of separately formed fins 138. The separately formed fins 138 are also configured as partial nozzles (i.e., nozzles extending towards, but stopping short of the inner wall 140) and are attached to the base portion 137. Further, for the embodiment depicted, the plurality of separately formed fins 142, 138 may each be spaced along the circumferential direction C, and may alternate between inner fin 142 and outer fin 138 along the circumferential direction C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component assembly for a gas turbine engine comprising a combustor defining a combustion chamber, the gas turbine engine defining a core air flowpath, a radial direction, and a circumferential direction, the component assembly comprising:
   a first wall for at least partially defining the core air flowpath at a location downstream of the combustion chamber; and
   a second wall for at least partially defining the core air flowpath at a location downstream of the combustion chamber and located opposite the core air flowpath of the first wall, the first wall comprising a plurality of first fins extending towards the second wall along the radial direction and spaced along the circumferential direction and the second wall comprising a plurality of second fins extending towards the first wall along the radial direction and spaced along the circumferential direction, each of the plurality of second fins located between adjacent first fins along the circumferential direction, wherein the plurality of first fins and the plurality of second fins are positioned between the combustion chamber and a first stage of turbine rotor blades;
   wherein the plurality of second fins each defines a fin tip, wherein the fin tip of each of the plurality of second fins defines a clearance with the first wall along the radial direction, and wherein the plurality of second fins of the second wall do not contact the first wall such that the clearance is greater than zero; and
   wherein each fin of the plurality of first fins and the plurality of second fins defines an airfoil shape along an axial direction having a pressure side and a suction side, and wherein each fin comprises a downstream end and defines a height along the radial direction, wherein the height of each fin tapers towards the downstream end, wherein the pressure side of each first fin in the plurality of first fins faces the suction side of an adjacent second fin of the plurality of second fins in the circumferential direction.

2. The component assembly of claim 1, wherein the first wall is an outer wall, wherein the second wall is an inner wall, and wherein the plurality of second fins are inner fins and the plurality of first fins are outer fins.

3. The component assembly of claim 2, wherein the combustor of the gas turbine engine comprises an inner liner and an outer liner, wherein the outer wall is attached to or formed integrally with the outer liner, and wherein the inner wall is attached to or formed integrally with the inner liner.

4. The component assembly of claim 3, wherein the outer wall is formed integrally with the outer liner, and wherein the inner wall is formed integrally with the inner liner.

5. The component assembly of claim 4, wherein the outer wall is formed of a ceramic matrix composite (CMC) material, and wherein the inner wall is also formed of a CMC material.

6. The component assembly of claim 2, wherein the outer fins are spaced substantially evenly along the circumferential direction, and wherein the inner fins are also spaced substantially evenly along the circumferential direction.

7. The component assembly of claim 2, wherein the outer wall comprises a plurality of outer valleys between adjacent outer fins, wherein the inner wall comprises a plurality of inner valleys between adjacent inner fins, wherein the outer fins extend towards the inner valleys along the radial direction, and wherein the inner fins extend towards the outer valleys along the radial direction.

8. The component assembly of claim 7, wherein the clearance defined by each fin tip of the first plurality of fins is an inner fin clearance defined with a respective outer valley along the radial direction, wherein a portion of the core air flowpath defined by the inner wall and outer wall of the component assembly defines a height along the radial direction, wherein the inner fin clearance is less than about fifteen percent (15%) of the height of the core air flowpath.

9. The component assembly of claim 7, wherein the outer fins each defines an outer fin tip, wherein the outer fin tip of each of the outer fins defines an outer fin clearance with the inner wall along the radial direction, wherein the outer fins of the outer wall do not contact the inner wall such that the outer fin clearance is greater than zero, wherein the outer fin clearance of each outer fin tip is defined with a respective inner valley along the radial direction, wherein a portion of the core air flowpath defined by the inner wall and outer wall of the component assembly defines a height along the radial direction, wherein the clearance is less than about fifteen percent (15%) of the height of the core air flowpath.

10. The component assembly of claim 2, wherein the inner fins each define an inner fin tip and the outer fins each define an outer fin tip, wherein the outer fin tips of the outer fins of the outer wall, the inner fins tips of the inner fins of the inner wall, and the core air flowpath each define a height along the radial direction at a location along a central axis of the gas turbine engine, and wherein the heights of the inner fin tips and the outer fin tips are at least about fifty percent (50%) of the height of the core air flowpath.

11. The component assembly of claim 1, wherein the component assembly is located immediately downstream of the combustion chamber of the combustor of the gas turbine engine when installed in the gas turbine engine.

12. The component assembly of claim 1, wherein each fin defines a curved profile along the axial direction.

13. The component assembly of claim 1, wherein the first wall is an outer wall, wherein the component assembly is positioned forward of the first stage of turbine rotor blades of the gas turbine engine, and wherein the outer wall of the component assembly is attached to, or formed integrally with, a shroud assembly located outward of the first stage of turbine rotor blades along the radial direction.

14. The component assembly of claim 1, and wherein at least one of the second wall defines a plurality of airflow passages at the fin tips of the plurality of second fins, or the first wall defines a plurality of airflow passages proximate the fin tips of the plurality of second fins.

15. The component assembly of claim 1, wherein the second wall includes a base portion, and wherein the plurality of second fins of the second wall are attached to the base portion of the second wall.

16. A gas turbine engine defining a radial direction and a circumferential direction, the gas turbine engine comprising:
   a combustion section comprising a combustor defining a combustion chamber; and
   a turbine located downstream of the combustion section, the combustion section and the turbine at least partially defining a core air flowpath of the gas turbine engine, the turbine comprising a component assembly and a first stage of turbine rotor blades located downstream of the component assembly, the component assembly comprising:
- an outer wall at least partially defining the core air flowpath, the outer wall comprising a plurality of outer fins extending inwardly along the radial direction, the plurality of outer fins spaced along the circumferential direction; and
- an inner wall located inwardly from the outer wall along the radial direction and at least partially defining the core air flowpath, the inner wall comprising a plurality of inner fins extending outwardly along the radial direction and spaced along the circumferential direction, each of the plurality of inner fins located between adjacent outer fins along the circumferential direction;
- wherein the plurality of inner fins each defines a fin tip, wherein the fin tip of each of the plurality of inner fins defines a clearance with the outer wall along the radial direction, and wherein the plurality of inner fins of the inner wall do not contact the outer wall such that the clearance is greater than zero; and
- wherein each fin of the plurality of inner fins and the plurality of outer fins defines an airfoil shape along an axial direction having a pressure side and a suction side, and wherein each fin comprises a downstream end and defines a height along the radial direction, wherein the height of each fin tapers towards the downstream end, wherein the pressure side of each inner fin in the plurality of inner fins faces the suction side of an adjacent outer fin of the plurality of outer fins in the circumferential direction.

17. The gas turbine engine of claim 16, wherein the combustor of the gas turbine engine comprises an inner liner and an outer liner, wherein the outer wall is attached to or formed integrally with the outer liner, and wherein the inner wall is attached to or formed integrally with the inner liner.

\* \* \* \* \*